(12) United States Patent
Haddad et al.

(10) Patent No.: US 8,285,064 B2
(45) Date of Patent: Oct. 9, 2012

(54) METHOD FOR PROCESSING IMAGES AND THE CORRESPONDING ELECTRONIC DEVICE

(75) Inventors: Julien Haddad, Paris (FR); Dominique Thoreau, Cesson Sevigne (FR); Philippe Salmon, Saint Sulpice la Foret (FR); Xavier Castellan, Cesson Sevigne (FR); Christophe Chevance, Brece (FR)

(73) Assignee: Thomson Licensing, Issy les Moulineaux (FR)

( * ) Notice: Subject to any disclaimer, the term of this patent is extended or adjusted under 35 U.S.C. 154(b) by 345 days.

(21) Appl. No.: 12/452,694

(22) PCT Filed: Jul. 15, 2008

(86) PCT No.: PCT/EP2008/059250
§ 371 (c)(1),
(2), (4) Date: Jan. 15, 2010

(87) PCT Pub. No.: WO2009/010515
PCT Pub. Date: Jan. 22, 2009

(65) Prior Publication Data
US 2010/0119169 A1    May 13, 2010

(30) Foreign Application Priority Data

Jul. 17, 2007   (EP) .................................... 07290890

(51) Int. Cl.
*G06K 9/36* (2006.01)
(52) U.S. Cl. ......... 382/250; 382/248; 382/233; 382/243
(58) Field of Classification Search .................. 382/199, 382/219, 220, 232, 233, 238, 240, 248, 250, 382/254, 268, 275; 375/240.16, 240.18, 375/240.2, 240.24
See application file for complete search history.

(56) References Cited

U.S. PATENT DOCUMENTS 5,832,118 A * 11/1998 Kim ............................... 382/224
6,584,225 B1 * 6/2003 Moroney ....................... 382/235
(Continued)

FOREIGN PATENT DOCUMENTS
EP        0801506       10/1997
(Continued)

OTHER PUBLICATIONS

Search Report Dated Sep. 18, 2008.

*Primary Examiner* — Matthew Bella
*Assistant Examiner* — Mekonen Bekele
(74) *Attorney, Agent, or Firm* — Tutunjian & Bitetto, P.C.

(57) ABSTRACT

The invention concerns a method for processing images, texture pattern blocks representative of a typical texture of the images being stored in a memory, the method comprising the following steps:
  transforming the pixel grey levels of a current block into a current block of frequency coefficients using a predefined transform;
  building up a merger block, each frequency coefficient positioned at a defined place of the merger block being equal either to the frequency coefficient positioned at the same place of the current block, or to the frequency coefficient positioned at the same place of a texture pattern block among the texture pattern blocks stored in the memory;
  selecting a merger block according to a predefined function (J); and
  replacing in the image the current block by the selected merger block.
The invention also concerns an electronic device for processing the corresponding images.

17 Claims, 9 Drawing Sheets

U.S. PATENT DOCUMENTS

| | | | |
|---|---|---|---|
| 6,683,979 B1 * | 1/2004 | Walker et al. | 382/166 |
| 6,728,406 B1 * | 4/2004 | Murao | 382/191 |
| 7,003,170 B1 * | 2/2006 | Martucci et al. | 382/250 |
| 7,995,649 B2 * | 8/2011 | Zuo et al. | 375/240.03 |
| 2001/0048770 A1 * | 12/2001 | Maeda | 382/243 |
| 2004/0233989 A1 * | 11/2004 | Kobayashi et al. | 375/240.16 |
| 2006/0115176 A1 * | 6/2006 | Kanamori et al. | 382/266 |
| 2006/0285598 A1 | 12/2006 | Tulkki | |
| 2007/0013713 A1 * | 1/2007 | Sekine et al. | 345/582 |

FOREIGN PATENT DOCUMENTS

JP  2002366968 A  * 12/2002

* cited by examiner

METHOD FOR PROCESSING IMAGES AND THE CORRESPONDING ELECTRONIC DEVICE

This application claims the benefit, under 35 U.S.C. §365 of International Application PCT/EP2008/059250, filed Jul. 15, 2008, which was published in accordance with PCT Article 21(2) on Jan. 22, 2009 in English and which claims the benefit of European patent application No. 07290890.8, filed Jul. 17, 2007.

The invention belongs to the video coding domain and to the compressing domain. Specifically, the invention relates to a method and a device for processing images.

In the coding methods like the methods defined by the JPEG, MPEG1, MPEG2, or the H.264 standard, each image is first divided into portions named blocks or macro blocks according to their size, then they are processed by turns separately one from another. During the decoding process, the blocks are reconstructed one after another independently one from another and assembled together to recover each image.

Since blocks are processed separately during the coding process, blocks artifacts are perceptible in the reconstructed images. These artefacts are visually annoying.

Various image processing techniques such as Markovian Random Fields, adaptive filtering, projection onto convex sets deal with this problem in the literature. All those methods lead to a fairly good result in removing blocking artifacts.

However, those methods introduce an additional noise which induces a flickering which is quite annoying visually. The resulting image is slightly blurred.

It is therefore desirable to develop a new method for removing blocking artifacts.

Accordingly, it is an object of the invention to provide a method and an electronic device as recited in claims 1, 12 and 16.

Other features of the method and the device are further recited in the dependent claims.

Other aspects of the invention will be apparent from the following description and drawings upon which.

In the context of the invention, an encoder is adapted to process independently one from other portions of the image having a size of eight lines on eight columns hereafter named blocks.

In particular, this encoder is able to encode images of a video sequence using a Discrete Cosine Transform for reducing spatial redundancy and a motion compensation inter-frame prediction for reducing temporal redundancy. These encoding methods are well known. A description of them can be found in a Research and Development Report of the BBC entitled "MPEG VIDEO CODING: A basic tutorial introduction" from S. R. Ely.

According to the invention, this encoder is adapted to select blocks in the image and to introduce information identifying these blocks in a bit stream to be sent to a decoder. These blocks are portions of the image having a size of eight lines on eight columns. They are representative of typical textures of the image. They are hereafter named texture pattern blocks.

For example, 1.5% of the blocks of an image can be selected as texture pattern blocks.

According to the invention, there are two possibilities for introducing the information identifying these texture pattern blocks into the bit stream.

According to the first one, the coordinates of the texture pattern blocks are included in free spaces forecasted in the existing standards.

According to the second one, the quantization index, also named QP index, used during the coding to control the bit rate, is lowered for the coding of the texture pattern blocks. This QP index controls the quantization in a block. It is usually set between 0 and 51. The higher the QP index is set, the more the block is compressed.

According to the invention, the QP index set on the texture pattern blocks is lower than the QP index set on the other blocks of the image. Since the QP index is lower for the texture pattern blocks, the texture of these blocks is better preserved.

The encoder is adapted to transmit successively in the bit stream data representing each block of the image from the top-left one to the top-right one. These data comprise for each block the QP index and the frequency coefficients or a motion vector when the block is predicted from an associated block of another image.

At the decoder side, the blocks with a lower QP index are identified as described hereafter.

Figure 1:
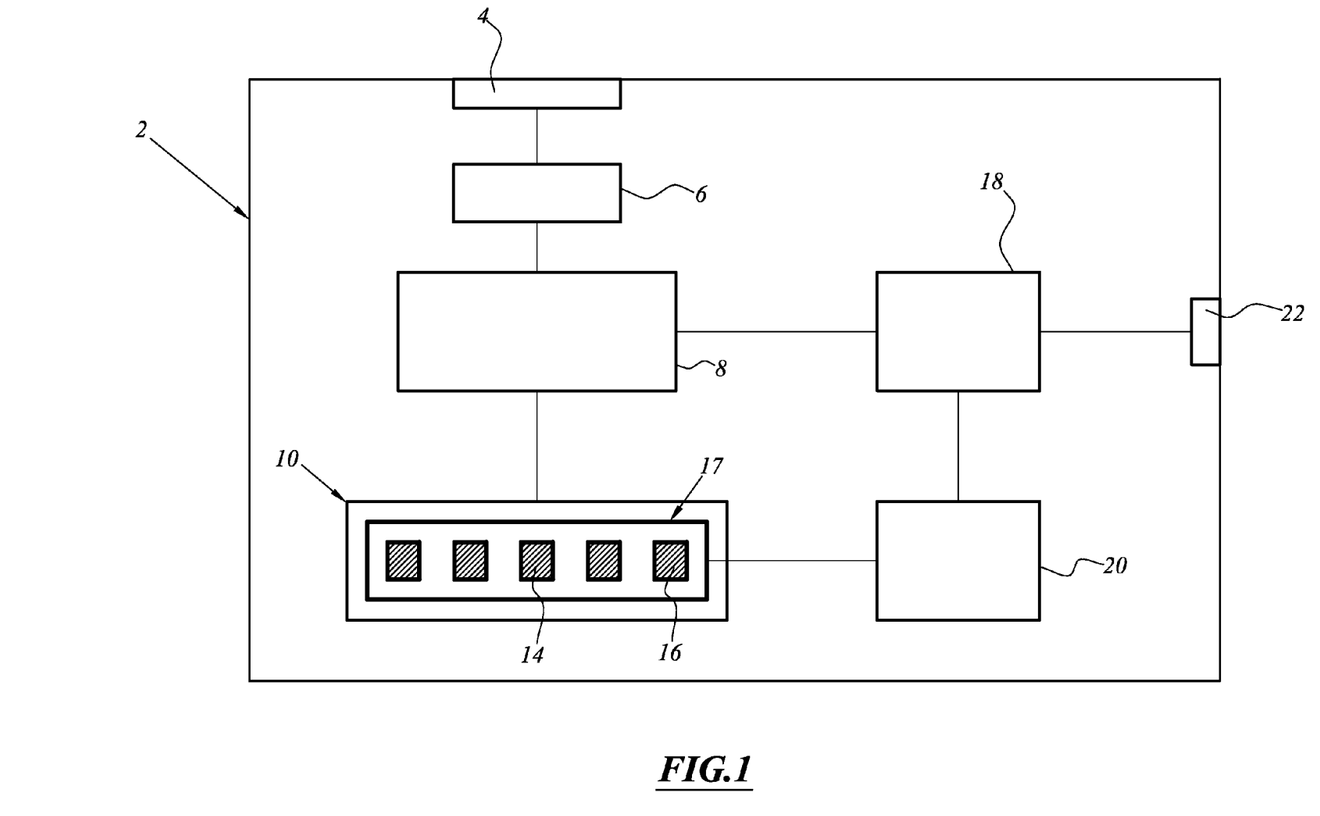
FIG. 1 is a functional block diagram of an electronic device according to the invention.

Referring to FIG. 1, a schematic block diagram of an electronic device 2 according to the invention is illustrated. This electronic device 2 is a decoder adapted to receive a bit stream from the encoder described above.

The electronic device 2 comprises an input 4 for receiving the bit stream which represents the video sequence coded by the above described encoder, a decoder 6 linked to the input 4, a reconstruction unit 8 linked to the decoder 6 and a memory 10 connected to the reconstruction unit 8.

Figure 2:
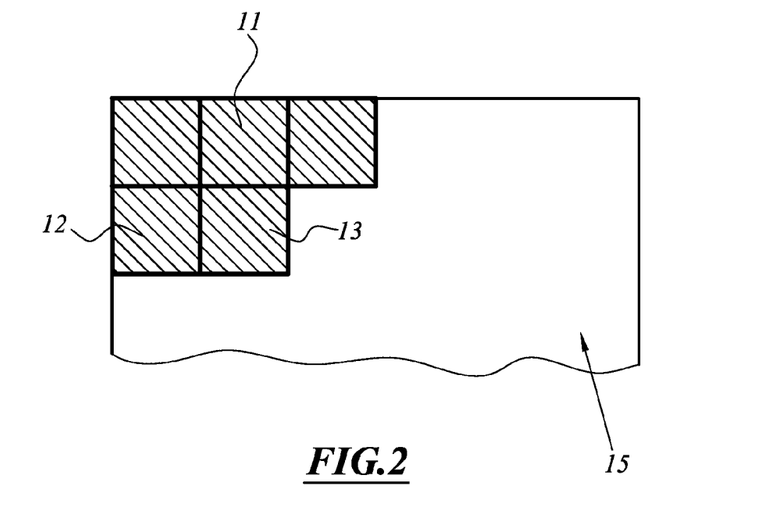
FIG. 2 is a schematic representation of an image divided into blocks.

The decoder 6 is adapted to decode the bit stream sent by the encoder to obtain data representing the blocks 11, 12, 13 of the image 15 and/or the motion vectors as shown in FIG. 2.

The reconstruction unit 8 is adapted to reconstruct each block 11, 12, 13 of the image from the decoded data as well known.

According to the invention, the reconstruction unit 8 is further able to recover the texture pattern blocks 14, 16 from the information included in the bit stream on the encoder side.

To this end, the reconstruction unit 8 is adapted to either read the information included in the free spaces forecasted in the standard method or to identify the blocks coded with a lower QP index.

The texture pattern blocks 14, 16 reconstructed for each image constitutes a dictionary 17 of textures which is stored in the memory 10.

The electronic device 2 also comprises a control unit 18 linked to the reconstruction unit 8 and to the memory 10, a texture merger 20 connected to the memory 10 and to the control unit 18, and finally an output 22 linked to the control unit 18.

Figure 9:
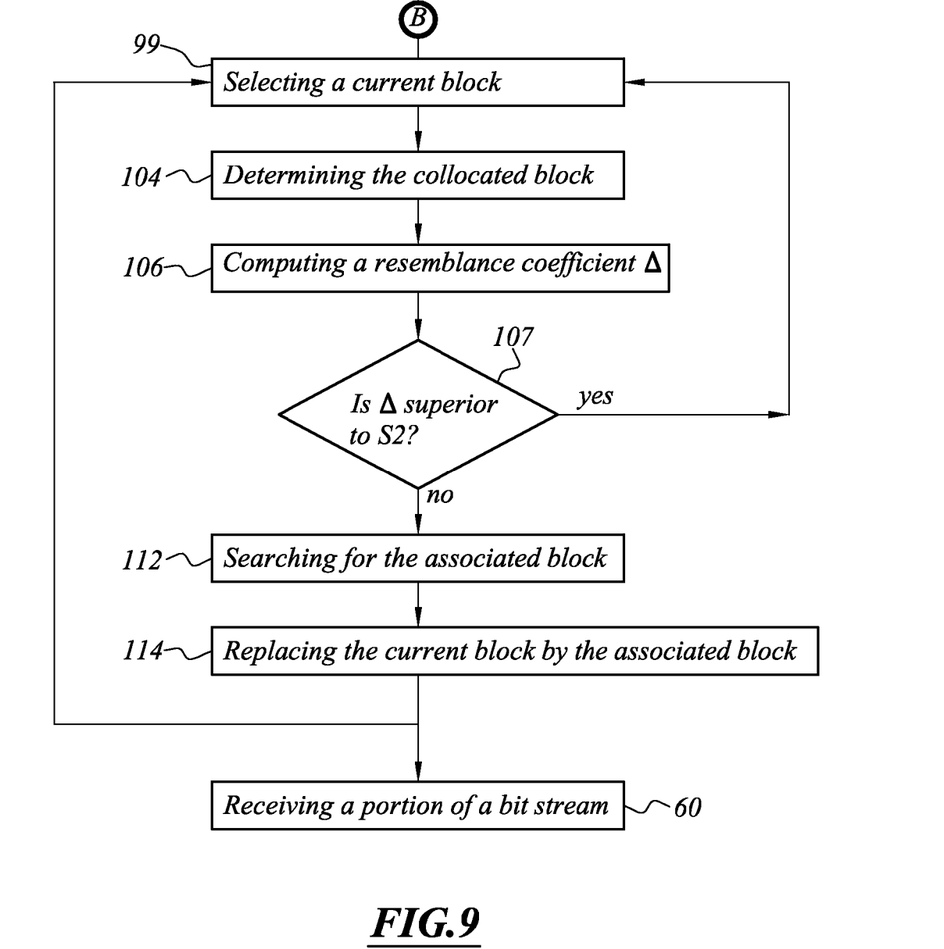
FIG. 9 is a flow chart illustrating the steps for processing inter images.

The control unit 18 is able to transmit to the texture merger 20 the intra blocks image and the blocks belonging to an inter image and associated to a motion vector; and to carry out the method illustrated in FIG. 9 for the blocks belonging to an inter image and associated to a motion vector.

The control unit 18 is adapted to select successively the blocks of the reconstructed image that are not texture pattern blocks, to process them for removing artifacts and to replace each selected block by the processed block.

The texture merger 20 is able to build up a merger block 24 for each block 13 selected by the control unit 18.

Figure 3:
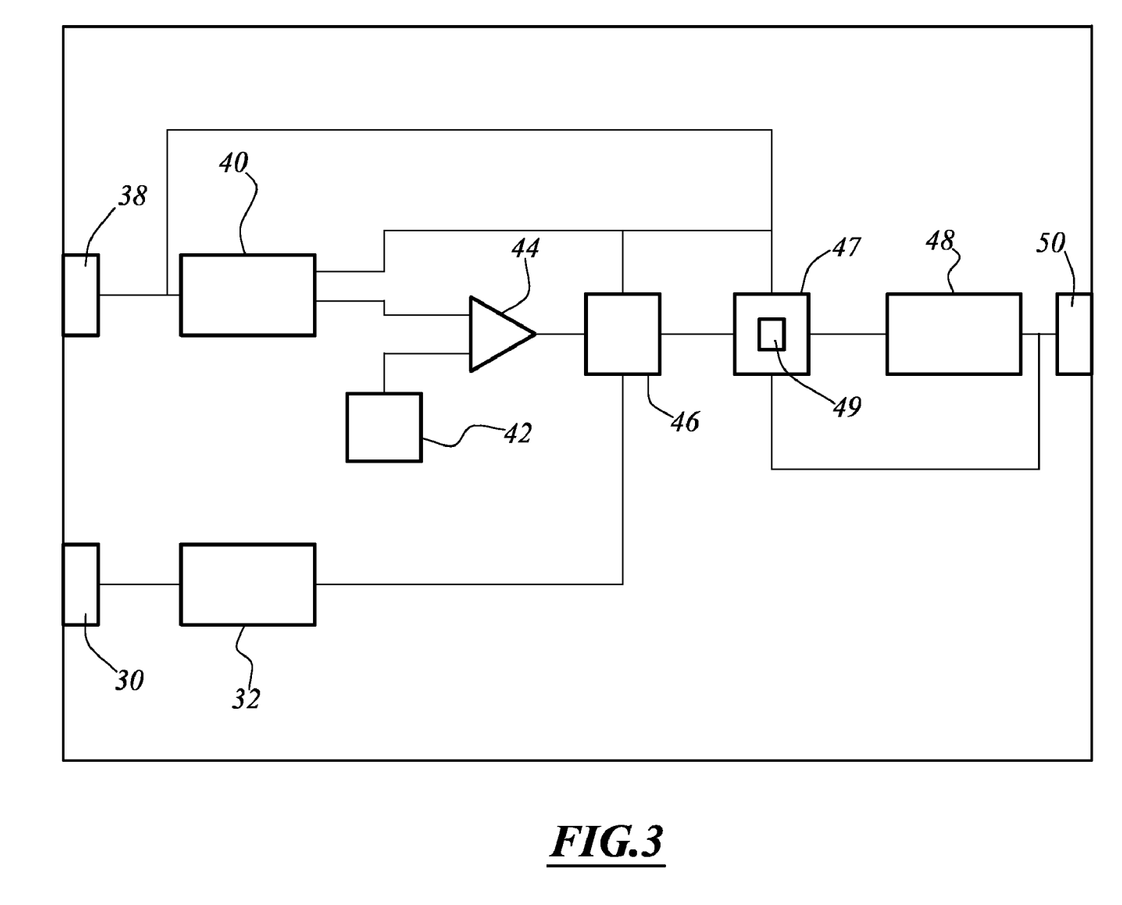
FIG. 3 is a functional block diagram of a texture merger according to the invention.

Referring to FIG. 3, the texture merger 20 is illustrated. It comprises a first input 30 for receiving each texture pattern block 14, 16 and a first DCT unit 32 linked to the first input 30 for transforming the pixel grey levels of the texture pattern block into frequency coefficients.

The texture merger 20 includes a second input 38 adapted to receive the block 13 selected by the control unit 18, a second DCT unit 40 linked to the input 38 for transforming the pixel grey levels of the block 13 into frequency coefficients, a memory 42 storing a first threshold S1 and a comparator 44 connected to the memory 42 and to the second DCT unit 40.

Each DCT unit 32, 40 is a computation unit able to transform each inputted block 13 comprising the grey levels into a block 13 comprising the frequency coefficients representative of these grey levels. The coefficient placed at the top left corner of the block is usually called the DC coefficient and the other coefficients are usually named AC coefficients. The place of a coefficient in a block of coefficients corresponds to its frequency rank, the AC coefficient at the bottom right of the block corresponding for example to the highest frequencies.

The first threshold S1 is comprised for instance between 20 and 40. Preferentially, the first threshold S1 is equal to 30.

The comparator 44 is adapted to compare the frequency coefficients of the block to the first threshold S1 stored in the memory 42.

The texture merger 20 comprises a builder unit 46 connected to the output of the comparator 44 and to the DCT units 32 and 40, a selection unit 47 linked to the builder unit 46, to the second DCT unit 40 and to the second input 38, an IDCT unit 48 connected to the selection unit 47 and an output 50 linked to the IDCT unit 48.

Figure 4:
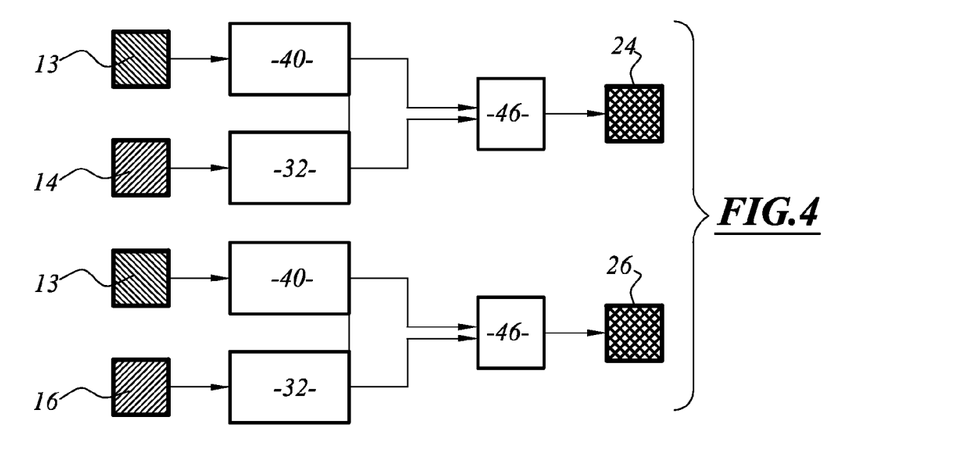
FIG. 4 is a schematic representation of the building of two different merger blocks from a single current block.

The builder unit 46 is a processor adapted to generate a merger block 24, 26 for each selected block 13 and for each texture pattern block 14, 16 as illustrated in FIG. 4.

The selection unit 47 is adapted to compute a variation value J associated to each merger block 24, 26 of a current processed block 13 and to select the merger block 24, 26 fulfilling a criterion for being transmitted to the IDCT unit 48.

The variation value is representative of the frequency similarity between the selected block 13 and the texture pattern block 14 and of the grey level gradient between the selected block and at least one block adjacent to the selected block 13.

The selection unit 47 comprises a memory 49 for storing the merger block 24 received from the IDCT unit 48.

The IDCT unit 48 is able to make the Inverse Discrete Cosine Transform for transforming into grey levels the frequency coefficients of each merger block 24 selected by the unit 47. The output of IDCT unit 48 is linked to the selection unit 47 for transmitting to the memory 49 the merger block 24 expressed in terms of grey levels.

Figure 5:
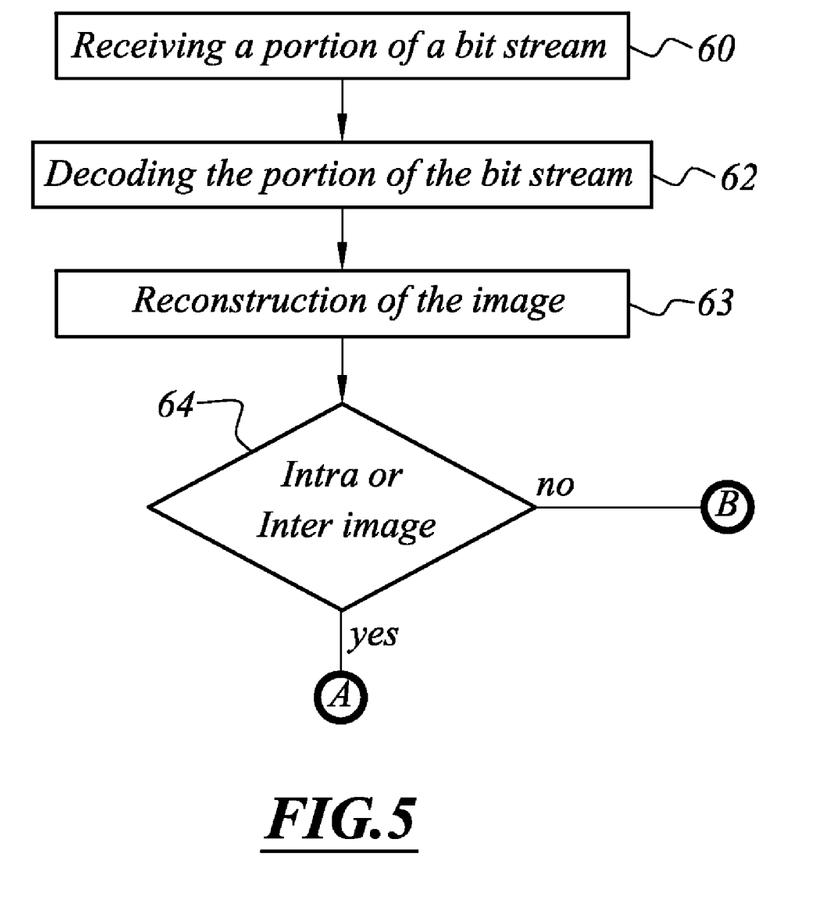
FIG. 5 is a flow chart illustrating a method for reconstructing the images of a video sequence coded using motion compensated inter frame prediction.

Referring to FIG. 5, the method according to the invention begins with a step 60 of reception of a portion of a bit stream.

At step 62, the decoder 6 decodes this portion of bit stream to obtain data and possibly motion vectors.

At step 63, the reconstruction unit 8 reconstructs the image 15 and the possible motion vectors from the data issued by the decoder 6.

At step 64, the control unit 18 determines if the reconstructed image 15 is an intra image i.e. an image coded without reference to other images or an inter image i.e. an image coded using a motion compensated prediction from other images.

For the present invention, we assumed that the first image of the video sequence is an intra image.

Figure 6:
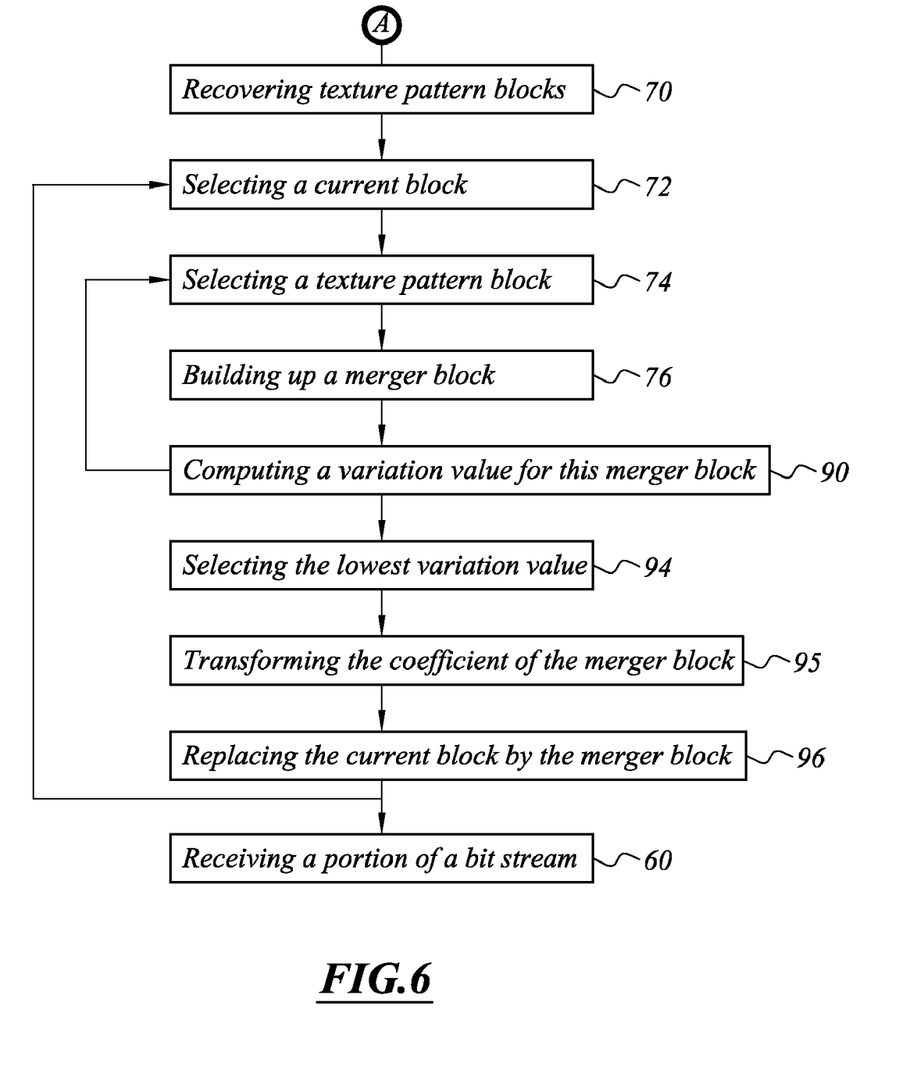
FIG. 6 is a flow chart illustrating the steps for processing intra-images.

When the received image is an intra image, this image is processed according to the flow chart illustrated in FIG. 6.

When the received image is an inter image, this inter image is processed according to the flow chart illustrated in FIG. 9.

Referring to FIG. 6, the method of processing an intra image 15 comprises a first step 70 during which the texture pattern blocks 14, 16 selected at the encoder side are recovered to form the dictionary of textures 17 representative of the typical textures of the image 15.

At step 72, the control unit 18 selects a current block 13 from the reconstructed image received from unit 8. All the blocks of the image 15 will be in turn selected according to a raster scan order except for the texture pattern blocks, the lower QP index insuring that the latters have the proper texture.

At step 74, the texture merger 20 selects a first texture pattern block 14 in the dictionary 17.

Figure 7:
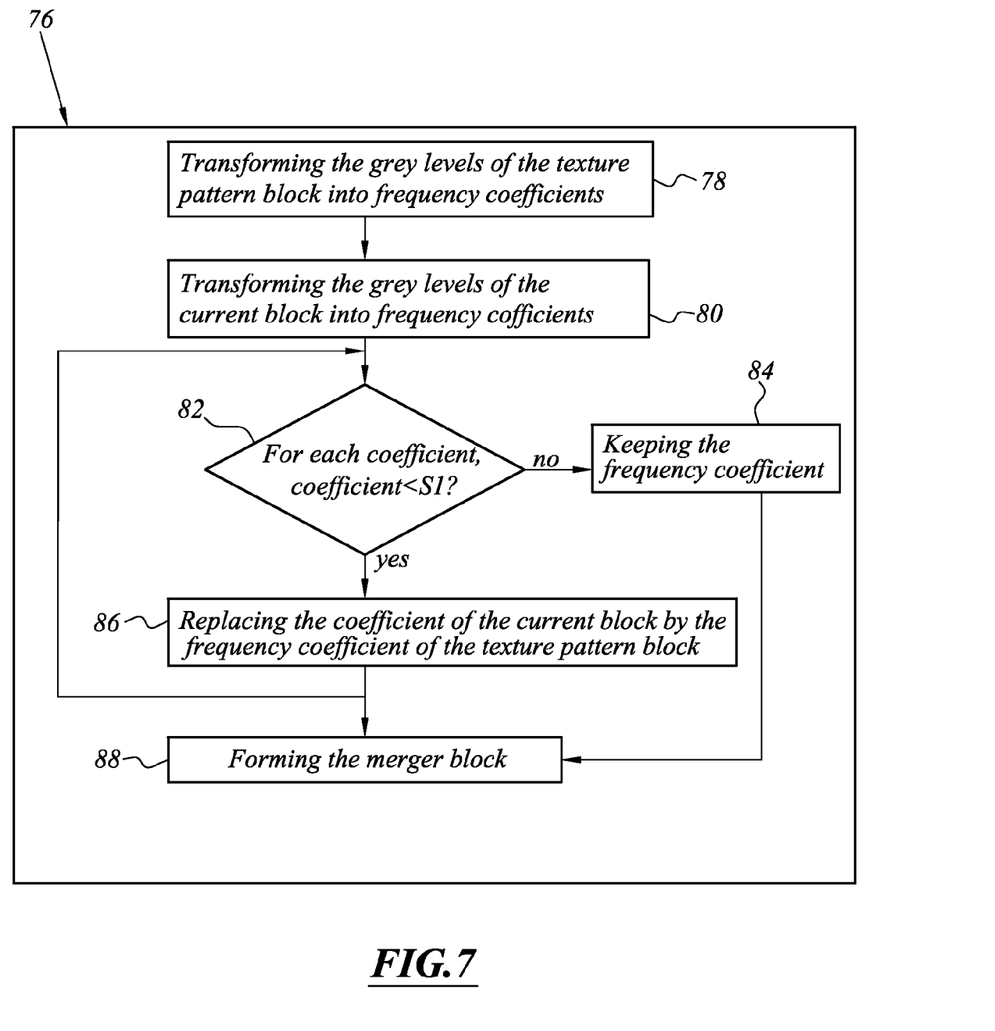
FIG. 7 is a flow chart illustrating the steps of building up a merger block.

After, in step 76, the texture merger 20 builds up a merger block 24 by performing the steps illustrated in FIG. 7.

During step 78, the grey levels of the selected texture pattern block 14 are transformed into frequency coefficients by the DCT unit 32.

In the same manner, the grey levels of the current block 13 are transformed into frequency coefficients by the DCT unit 40, at step 80.

In step 82, a frequency coefficient positioned at a localization defined by the coordinates (i, j) of the current block 13 is compared to the first threshold S1 by the comparator 44.

When this frequency coefficient is greater than this threshold, the builder unit 46 copies during step 84 this coefficient into a new block named merger block at the same localization (i, j) where the frequency coefficient of the current block 13 is placed.

When this frequency coefficient is lower than the first threshold S1, the builder unit 46 searches for the frequency coefficient of the texture pattern block 14 placed at the same localization (i, j) and copies said found frequency coefficient into the merger block 24 at the localization (i, j) during step 86.

The resulting merger block 24 is a copy of the current block in which all the frequency coefficients lower than the first threshold S1 are replaced by the frequency coefficients of the selected texture pattern block 14.

Steps 82 and 84 or 86 are repeated for all the frequency coefficients of the current block 13 until the merger block 24 is formed at step 88.

At step 90, the selection unit 47 calculates a variation value J from the following function: $J = C + \lambda D$ Where:

$\lambda$ is a predefined scalar;

D is a frequency similarity component; and

C is a grey level gradient component.

For example, λ is comprised between 0.3 and 0.8. Preferentially, λ is equal to 0.5.

The frequency similarity component D represents the difference between the low frequency coefficients of the current block 13 and the texture pattern block 14.

The frequency similarity component D is obtained from the following equation:

$$D = \sum_{\substack{i,j=0 \\ i+j \neq 0}}^{k} |B_{current}^{DCT}(i, j) - B_{texture}^{DCT}(i, j)|$$

Where:
D is the frequency similarity component;
$B_{current}^{DCT}(i, j)$ is the frequency coefficient in line i and column j of the DCT transformation of the current block 13;
$B_{texture}^{DCT}(i,j)$ is the frequency coefficient in line i, column j of the DCT transformation of the texture pattern block 14;
k is an integer inferior to the total number of lines or columns in a block.

Since the current block has been quantized, it laks high frequency information so k is chosen inferior to the total number of lines and columns of the block 13.

For example, k is comprised between 3 and 5.

When k is equal to 4, the first 15 AC frequency coefficients placed at the top-left corner of the current block are considered for the computation of the frequency similarity component D. These AC frequency coefficients represent the lower frequency of the current block. The DC coefficient placed at the top-left corner is not considered because it represents the medium value of the grey level of the current block 13.

The grey level gradient component C is obtained from the following equation:

$$C = \sum_{j=0}^{l} |B_{current}(0, j) - B_{above}(7, j)| + \sum_{i=0}^{m} |B_{current}(i, 0) - B_{left}(i, 7)|$$

Figure 8:
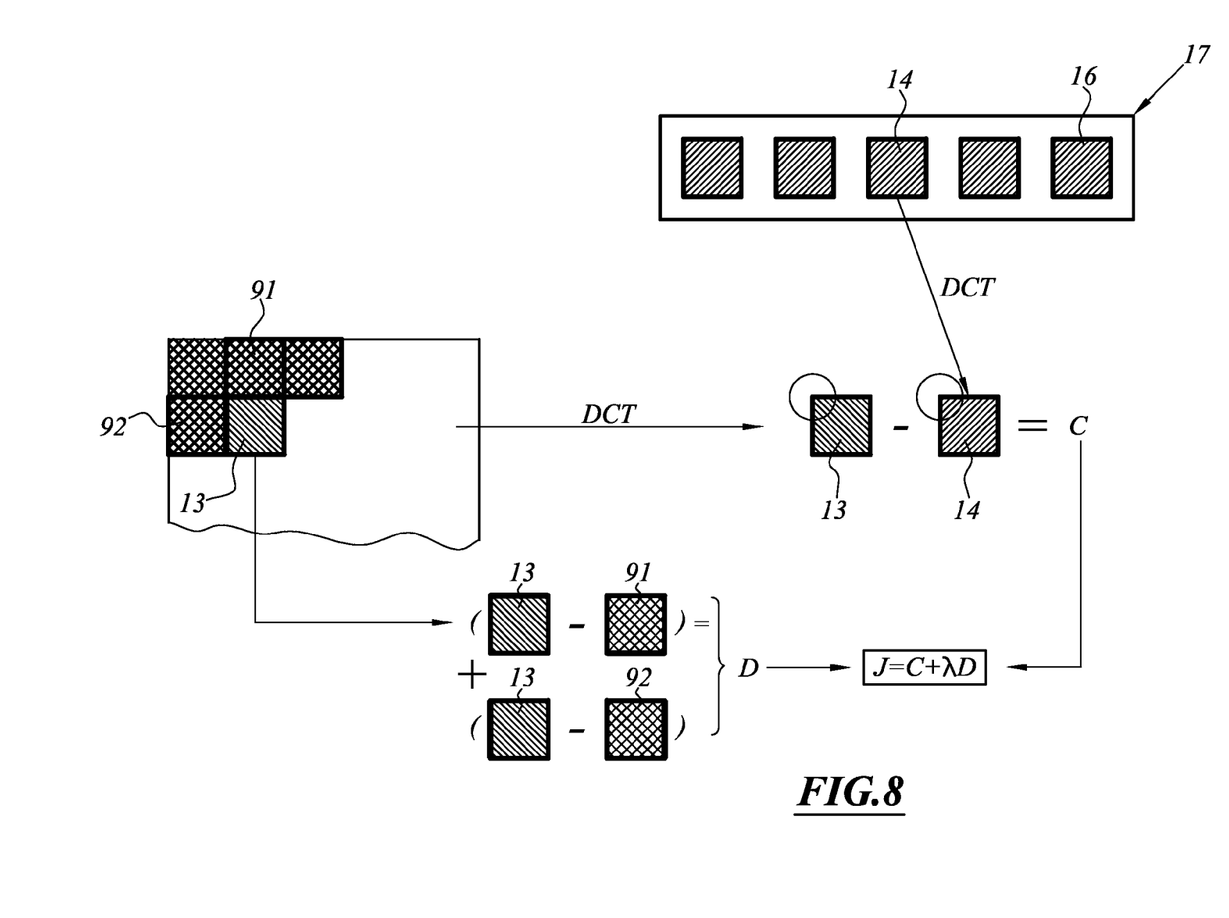
FIG. 8 is a schematic representation of the computation of a variation value according to the invention.

Where:
C is the grey level gradient component;
l is an integer equal to the total number of columns j of the block i.e. to 8 in the described embodiment;
m is an integer equal to the total number of lines i of the block;
$B_{current}(0,j)$ is the grey level of each pixel positioned in the first line of the current block 13, j being an integer representing each column;
$B_{current}(i,0)$ is the grey level of each pixel in the first column of the current block 13, I being an integer representing each line;
$B_{above}(m, j)$ is the grey level of each pixel in line m and column j of the block 91 located above the current block 13 as shown in FIG. 8;
$B_{left}(i, I)$ is the grey level of each pixel in line i and column I of the block 92 located on the left of the current block.

The grey level gradient component C is obtained from the computing of the gradient between the current block 13 and its direct neighbors which have already been processed according to the present method. These blocks 91 and 92 are stored in the memory 49.

Since the image is processed according to a raster scan order, most current blocks have a block located above them and a block located on their left. The first block selected is located at the top-left corner of the image and has no neighbor which has already been processed according to the method. No grey level gradient component is computed for this block. The second block selected has only one neighbor on its left which has already be processed so, for this block the grey level gradient component C is computed only according to its left be neighbor.

Steps 74 to 90 are repeated for all the other texture pattern blocks of the dictionary 17 to obtain a number of merger blocks and a number of variation values equal to the number of texture pattern blocks in the dictionary 17.

For example, the merger block 26 is obtained from the current block 13 and the texture pattern block 16 as shown in FIG. 4.

Thus, to each texture pattern block 14, 16 of the dictionary is associated a merger block 24, 26 as well as a variation value J.

During step 94, the selection unit 47 selects the merger block 24 fulfilling a predefined criterion i.e. having the lowest variation value, among the merger blocks 24, 26 associated to each texture pattern blocks 14, 16.

At step 95, the frequency coefficients of the selected merger block 24 are transformed into grey levels by the IDCT unit 48 using an inverse Discrete Cosine Transform.

The selected merger block 24 is transmitted to the control unit 18 through the output 50 as well as to the selection unit 47 for storing in the memory 49.

At step 96, the block selected by the control unit 18 is replaced by the merger block 24 obtained after an inverse DCT.

The process returns to step 72 where the next block of the reconstructed image 15 is selected according to a raster scan order. Steps 74 to 96 are repeated for this block and the other blocks of the image 15 until the end of the image.

Then, the process goes to step 60 where another portion of the bit stream representing a new image is processed.

Figure 10:
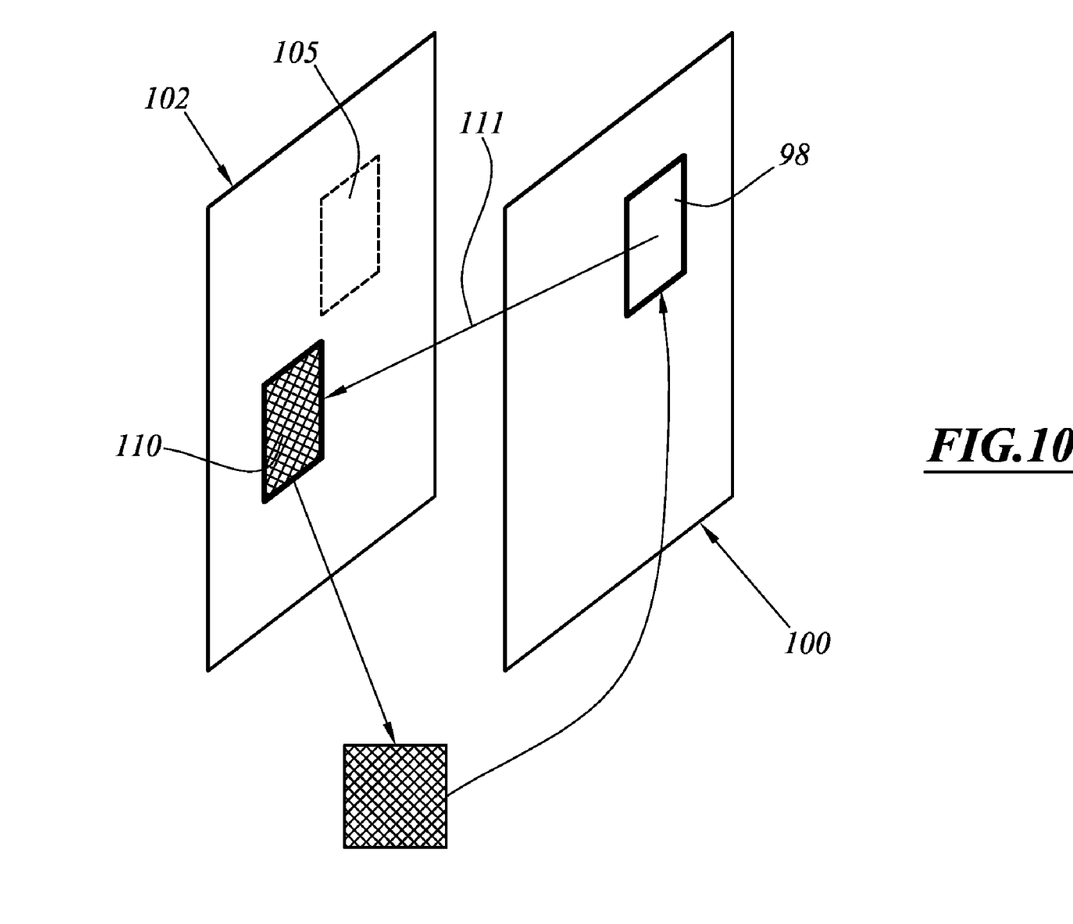
FIG. 10 is a schematic representation of the inter images processing.

When the image tested in step 64 is an inter image, the method goes to step 99 where a current block 98 is selected in the inter image 100 as shown in FIGS. 9 and 10.

At step 104, the block 105 located at the same position in a reference image 102 as the current block 98 of the current image 100 is determined. This block 105 is hereafter called collocated block. The reference image 102 is an image used for coding the current image 100 by motion compensated prediction.

At step 106, a resemblance coefficient Δ between the current block 98 and its collocated block 105 is computed according to the following equation:

$$\Delta = \sum_{i=0}^{m} \sum_{j=0}^{l} |B_{current}(i, j) - B_{collocated}(i, j)|$$

where:
$B_{current}(i, j)$ is the grey level of the pixel in line i and column j of the current block 98 of the current image 100;
I and m are equal to the total number of lines and columns of the block; and
$B_{collocated}(i, j)$ is the grey level of the pixel in line i and column j of the associated block 105 of the reference image 102.

At step 107, the resemblance coefficient Δ is compared to a second threshold S2. This threshold S2 is for example comprised between 1500 and 2500 and is preferably equal to 2000.

When the resemblance coefficient Δ is greater than the second threshold S2, the current block 98 is not processed because there is a high resemblance between this block 98 and its collocated block 105. Then, the method returns to step 99 where the next block according to the raster scan order is selected.

When the resemblance coefficient is inferior to the second threshold S2, a block 110 associated to the current block 98 is searched for by using the motion vector 111 obtained from the decoding of the bit stream during step 62. The current block 98 is the block predicted from the associated block 110, according to the motion compensated inter frame prediction coding.

Since the reference image 102 has already been processed according to the method of the invention, the associated block 110 is a merger block obtained from the performing of steps 70 to 96 described above.

At step 114, the current block 98 is substituted by the associated block 110 which has already been processed and which is therefore already a merger block.

Then, the process goes on with steps 99 to 114 until the end of the image.

When the inter image has been processed, the process continues with step 60 where another portion of the bit stream is received.

In variant, the encoder encode using other orthogonal transform like the one used in the following standard JPEG, MPEG1, MPEG2, H.264.

When the encoder uses the coding standard H.264, the information identifying the texture pattern block are stored in standard fields called SEI (Supplemental Enhancement Information).

The texture dictionary data are sent before the current frame to encode in a separate and independent NAL (Network Adaptation Layer) unit. This NAL unit corresponds to a new SEI message type dedicated to the texture dictionary, followed by the texture dictionary information containing all the information required to perform the texture merger processing at the decoder side. The texture dictionary information is composed of the number of dictionaries, the quantized step value, the number of texture blocks, the DCT size and the texture dictionary binary stream.

In variant, the method according to the invention is performed only on predefined regions of the images having a particular texture, for example on the feathers of an eagle.

On that case, the image is first segmented and the segmentation map is send to the decoder. A different texture dictionary can be chosen for each region.

When the video sequence comprises only intra images the process according to the invention is performed by the execution of steps 60, 62, 63 and 70 to 98.

According to the embodiment described here above, the method according to the invention is applied on coded and decoded images. However, it is also possible to apply this method on compressed image. In this case, the dictionary 17 of texture pattern block is already formed and the image is processed by execution of steps 72 to 96 using the already made dictionary.

The invention claimed is:

1. Method for processing at least one image, a block being a portion of the image, a grey level being associated to each pixel of the image, a plurality of texture pattern blocks representative of a texture of the image being stored in a memory, the pixel grey levels of each texture pattern block being transformed into frequency coefficients using a predefined transform, the method comprising the following steps:

a) selecting a current block in at least one part of the image;
b) transforming the pixel grey levels of the current block into a current block of frequency coefficients using the predefined transform;
c) building up a merger block for each stored texture pattern block, whereby a plurality of merger blocks is obtained, each frequency coefficient positioned at a defined place of each respective merger block being equal either to the frequency coefficient positioned at the same place of the current block, when said frequency coefficient of the current block complies with a criterion; or to the frequency coefficient positioned at the same place of the corresponding texture pattern block among the texture pattern blocks stored in the memory, when said frequency coefficient of the current block does not comply with said criterion;
d) selecting a merger block among the plurality of merger blocks, wherein for each merger block a predefined function is computed to obtain a variation value representative of the frequency similarity between the current block and each merger block's corresponding texture patter block, and a grey level gradient between the current block and at least one block adjacent to the current block is computed, and the merger block having the smallest variation is selected; and
e) replacing in the image the current block by the selected merger block.

2. Method according to claim 1, wherein the predefined function comprises a frequency similarity component D obtained from the following equation:

$$D = \sum_{\substack{i,j=0 \\ i+j \neq 0}}^{k} |B_{current}^{DCT}(i,j) - B_{texture}^{DCT}(i,j)|$$

Where:
D is the frequency similarity component;
$B_{current}^{DCT}(i,j)$ is the frequency coefficient in line i and column j of the DCT transformation of the current block;
$B_{texture}^{DCT}(i,j)$ is the frequency coefficient in line i, column j of the DCT transformation of the texture pattern block;
k is an integer inferior to the total number of lines or columns in a block.

3. Method according to claim 1, wherein the selection of a current block for implementing steps a) to e) is made in the image or a part of the image split into blocks, according to a predefined order which is a raster scan order and wherein the predefined function comprises a grey level gradient component (C) obtained from the following equation:

$$C = \sum_{j=0}^{l} |B_{current}(0,j) - B_{above}(7,j)| + \sum_{i=0}^{m} |B_{current}(i,0) - B_{left}(i,7)|$$

where:
C is the grey level gradient component;
I is an integer equal to the total number of columns j of the block;
m is an integer equal to the total number of lines i of the block;
$B_{current}(0,j)$ is the grey level of each pixel positioned in the first line of the current block, j being an integer representing each column;

$B_{current}(i,0)$ is the grey level of each pixel in the first column of the current block, i being an integer representing each line;

$B_{above}(m, j)$ is the grey level of each pixel in line m and column j of the block (91) located above the current block;

$B_{left}(i,l)$ is the grey level of each pixel in line i and column l of the block located on the left of the current block.

4. Method according to claim 1, wherein the predefined function is the following function $J=C+\lambda \times D$, $\lambda$ being a predefined scalar.

5. Method according to claim 1, wherein the method is performed on at least two images having been coded using a motion compensation inter-frame prediction, a current image having being coded using motion-compensated prediction from a reference image, the current and the reference images having been decoded, steps a) to d) having been performed on the reference image, on blocks successively selected according to a raster scan order, each motion vector representing the motion between one current block of the current image predicted from an associated block of the reference image being determined from the decoding of the current image, the method comprises the following steps:

j) selecting the current block in the current image;

k) determining in the reference image the block associated to the current block using the associated motion vector;

l) determining a collocated block in the reference image, the collocated block being located at the same emplacement in the reference image as the current block in the current image;

m) computing a resemblance coefficient $\Delta$ between the current block and the collocated block, the resemblance coefficient $\Delta$ being representative of the texture similarity between the current block and the collocated block;

if the resemblance coefficient $\Delta$ is greater than a predefined thresholdS2, selecting the next block according to a raster scan order and repeating steps j) to m) on this block;

if the resemblance coefficient $\Delta$ is lower than the predefined threshold S2, replacing the current block of the current image by the associated block of the reference image, the associated block being a merger block.

6. Method according to claim 5, wherein the resemblance coefficient $\Delta$ is obtained from the following:

$$\Delta = \sum_{i=0}^{m} \sum_{j=0}^{l} |B_{current}(i, j) - B_{collocated}(i, j)|$$

where:

$B_{current}(i, j)$ is the grey level of the pixel in line i and column j of the current block of the current image;

$B_{collocated}(i, j)$ is the grey level of the pixel in line i and column j of the associated block of the reference image; and l and m being the total number of lines and columns of a block.

7. Method according to claim 1, comprising a step of selecting a region in the image and applying step a) to e) only on the blocks of this selected region.

8. Method according to claim 1, wherein, in step c), the criterion of compliance is met when said frequency coefficient of the current block is lower than a predetermined threshold.

9. Method according to claim 1, wherein the predefined transform is a Discrete Cosine Transform.

10. Method according to claim 1, wherein the predefined transform is a standardized H.264 Transform.

11. Method of coding and decoding at least one image of a video sequence, a block being a portion of the image, wherein the coding steps comprise the following steps:

selecting a plurality of texture pattern blocks in the image, said blocks being representative of a texture of the image and having a lower quantization index (QP) than the other blocks of the image, generating information defining the texture pattern blocks, coding this information into a bit stream to be transmitted to a decoder; and in that the decoding steps comprise the following steps:

reconstructing the image from the bit stream;

determining the texture pattern blocks from the information contained in the bit stream;

storing the texture pattern blocks determined in a memory; and performing the method of processing according to claim 1.

12. Method according to claim 11, wherein the decoding steps comprise a step of selecting blocks representative of typical textures of the image and coded them with a lower quantization index QP.

13. Method according to claim 10, wherein the image is coded according to the standardized H.264 Transform and wherein the information defining the texture pattern clock is included in an area named "Supplemental Enhancement Information" in the standardized H.264 Transform.

14. Electronic device for processing at least one image, a block being a portion of the image, a grey level being associated to each pixel of the image, the device comprising:

a memory storing a plurality of texture pattern blocks representative of a typical texture of the image, the pixel grey levels of each texture pattern block being transformed into frequency coefficients using a predefined transform;

at least a first selection unit for selecting one after another current block in the image;

at least one computation unit adapted to transform the pixel grey levels of the current block into frequency coefficients using the predefined transform;

at least one builder unit able to build up a merger block for each stored texture pattern block, whereby a plurality of merger blocks is obtained, each frequency coefficient positioned at a defined place of each respective merger block being equal to the frequency coefficient positioned at the same place of the current block, when said frequency coefficient of the current block complies with a criterion; or to the frequency coefficient positioned at the same place of the corresponding texture pattern block among the texture pattern blocks stored in the memory, when said frequency coefficient of the current block does not comply with said criterion;

at least a second selection unit for selecting a merger block among the plurality of merger blocks, wherein for each merger block a predefined function is computed to obtain a variation value representative of the frequency similarity between the current block and each merger block's corresponding texture pattern block, and a grey level gradient between the current block and at least one block adjacent to the current block is computed, and the merger block having the smallest value is selected; and at least one computation unit adapted to transform the frequency coefficients of the merger block selected into grey levels using a transform inverse of the predefined transform; the first selection unit being adapted to replace in the image the current block by the selected merger block.

15. Electronic device according to claim 14, comprising:
a decoder adapted to decode a bit-stream representative of at least one coded image of a video sequence, the bit stream comprising information defining the texture pattern blocks; and
a reconstruction unit being adapted to reconstruct the image and the texture pattern block from the information contained in the bit stream.

16. Electronic device according to claim 15, wherein reconstruction unit is adapted to classified the blocks coded with a lower quantization index as texture pattern block.

17. Electronic device according to claim 15, wherein the image is coded using the standardized H.264 Transform and in that reconstruction unit is adapted to search for the information in an area named "Supplemental Enhancement Information" of the standardized H.264 Transform for reconstructing the or each texture pattern block.

* * * * *